United States Patent Office 3,663,433
Patented May 16, 1972

3,663,433
PROCESS FOR REDUCING SULFUR IN HYDROCARBONS WITH METALLIC MAGNESIUM

Edward A. Fraini, Lake Jackson, and David E. Minter, Austin, Tex., assignors to The Dow Chemical Company, Midland, Mich.
No Drawing. Filed Feb. 1, 1971, Ser. No. 113,031
Int. Cl. C10g 23/06
U.S. Cl. 208—213                                7 Claims

ABSTRACT OF THE DISCLOSURE

A crude hydrocarbon feedstock containing sulfur impurities is desulfurized, i.e. reduced in sulfur content, by reacting the feedstock in a hydrogen atmosphere with finely divided magnesium at a high temperature and pressure. The feedstock is then separated from the magnesium sulfide. Sulfur can be recovered from the magnesium sulfide and the magnesium recycled if desired.

BACKGROUND OF THE INVENTION

This invention relates to the desulfurization of a crude hydrocarbon feedstock containing sulfur impurities by reacting the feedstock with finely divided magnesium.

It is known from Pats. 3,164,545 and 3,169,918 that various catalysts can be used to desulfurize crude feedstocks.

SUMMARY OF THE INVENTION

It now has been discovered that the relatively expensive catalysts of the prior art can be eliminated if the crude hydrocarbon feedstock containing sulfur impurities in the form of organic mercaptans, organic sulfides, thiophenes, and the like is desulfurized with finely divided magnesium under the proper conditions.

Generally, the invention comprises a process for reducing sulfur impurities in a crude hydrocarbon feedstock which comprises, reacting in a hydrogen atmosphere, the feedstock with 0.1 to 0.2 weight finely divided magnesium per weight of feedstock wherein the reaction is conducted at a temperature in the range from 600–850° F., a pressure in the range from 100–2000 pounds per square inch gage (p.s.i.g.) and the magnesium has a particle size less than 170 microns and recovering the feedstock having reduced sulfur impurities.

More specifically, the invention comprises the steps of (1) mixing the feedstock with 0.1 to 0.2 weight finely divided magnesium per weight of feedstock,
(2) heating the magnesium-feed-stock mixture in a hydrogen atmosphere to a temperature in the range 600–850° F. under a pressure of 100–2000 p.s.i.g. with a hydrogen flow rate of 0.5 to 1.5 moles hydrogen per mole of feedstock per hour to produce magnesium sulfide, and
(3) recovering the treated feedstock from the magnesium sulfide.

DETAILED DESCRIPTION

The process of this invention is applicable to the treatment of lower boiling fractions of crude oil such as fuel oil, reduced crude oil, residium and the like to reduce the sulfur content thereof.

The process is dependent upon the use of finely divided magnesium metal having a particle size less than 170 microns to react with the sulfur impurities under the high temperature and pressure conditions set forth below to convert the sulfur in the impurities into magnesium sulfide.

Generally, the particle size of the finely divided magnesium will have a particle size in the range from about 25 to about 170 microns. The preferred range is from about 44 to about 149 microns.

In the process of desulfurization, the crude hydrocarbon feedstock is reacted in an autoclave under hydrogen atmosphere with the above finely divided magnesium in an amount within the range 0.1 to 0.2 pound of magnesium per pound of feedstock.

The temperature of the process should be maintained in the range from 600–850° F. The preferred range is 700° to 800° F.

The pressure used can vary from 100–2000 p.s.i.g. with the preferred range being from 500 to 1000 p.s.i.g.

The residence time of the magnesium-oil feedstock in the reactor is a variable factor depending upon the pressure-temperature conditions. For example, at 850° F. and 2000 p.s.i.g. the residence time should be 10 minutes and at 600° F. and 100 p.s.i.g. the residence time should be 80 minutes.

It is essential to this process that a hydrogen atmosphere be provided and maintained. Throughout the reaction, hydrogen gas at a rate of 0.5 to 1.5 moles per mole of feedstock per hour is provided. This purge gas can be purified with amines such as monoethanol amine to eliminate hydrogen sulfide and the product gas recirculated back to the reactor with additional hydrogen to replace what is lost as hydrogen sulfide. A relatively small amount i.e. 1.0–1.5 percent of the sulfur impurities in the feedstock is removed by the hydrogen. The majority of the sulfur is removed by the finely divided magnesium.

When the reaction is attempted with too little or no hydrogen gas, the feedstock is rapidly carbonized and essentially no desulfurization takes place. The same coke formation or carbonization takes place if the temperature is too high or the pressure is too low.

On the other hand, if the temperature is too low, substantially no reaction (i.e. no $H_2S$ or MgS formation) will take place. If the ratio of magnesium to feedstock is too low or the size of the finely divied magnesium too large, the same adverse effect is observed.

After the reaction takes place, the treated feedstock containing magnesium sulfide is conducted to a liquid-liquid extractor wherein a counter-current flow of dilute hydrochloric acid (about 10% by weight) is contacted with the treated feedstock to generate hydrogen sulfide as the overhead gas, magnesium chloride as the residue, and the desired desulfurized feedstock.

The $H_2S$ gas can be treated by known process to recover sulfur as a by-product of this invention.

The $MgCl_2$ can be treated by known electrolytic processes to regenerate finely divided magnesium which can then be recycled to the reactor.

The invention is further illustrated by the following example.

EXAMPLE

A reduced Near East crude oil (500 grams) having 5.72 percent by weight sulfur was placed in an autoclave equipped with paddle blades with 75 grams of finely divided magnesium of a particle size given below.

The autoclave was then heated to 750° F. and the pressure brought to 700 p.s.i.g. along with stirring of the contents. These conditions were maintained for one hour under a gas feed rate of 0.8 mole gas per mole crude oil per hour. The gases are listed below.

The desulfurized oil was then cooled to room temperature, filtered to remove MgS, and analyzed by X- ray emission for the sulfur content. The results of several runs are given below.

TABLE I

| Run: | Magnesium particle size in microns | Mg/oil ratio | Purge gas | Weight percent sulfur removal |
|---|---|---|---|---|
| 1 | [1] Control | | Hydrogen | 17 |
| 2 | 177–210 | 0.30 | do | 22 |
| 3 | 44–149 | 0.15 | Helium | 21 |
| 4 | 44–149 | 0.15 | Hydrogen | 45 |

[1] No magnesium.

From the foregoing, it is evident from Run #1 that some sulfur is removed with only a hydrogen atomsphere and no magnesium. If the magnesium is too coarse as in Run #2, the sulfur removal is not improved very much even for a higher magnesium-oil ratio. The effects of finely divided margnesium and an inert helium atmosphere is illustrated in Run #3. The combined effect of the finely divided magnesium and the hydrogen purge is illustrated in Run #4 wherein 45 percent of the sulfur is removed.

By varying the reaction conditions, within the ranges set forth above, the percent sulfur removed can be increased to as much as 50 percent.

We claim:
1. A process for reducing sulfur impurities in a crude hydrocarbon feedstock which comprises reacting said hydrocarbon feedstock in a hydrogen atmosphere with 0.1 to 0.2 weight of finely divided magnesium per weight of feedstock wherein the reaction is conducted at a temperature in the range of 600–850° F., a pressure in the range of 100–2000 p.s.i.g., and the magnesium has a particle size less than 170 microns and recovering said feedstock having reduced sulfur impurities.

2. The process as set forth in claim 1 in which hydrogen is supplied to the reaction at a rate in the range of 0.5 to 1.5 moles of hydrogen per mole of feedstock per hour.

3. The process as set forth in claim 1 in which the magnesium has a particle size in the range from about 25 to about 170 microns.

4. The process as set forth in claim 1 in which the magnesium has a particle size in the range from about 44 to about 149 microns.

5. A process for reducing sulfur impurities in a crude hydrocarbon feedstock which comprises the steps of
   (a) mixing said hydrocarbon feedstock with 0.1 to 0.2 weight of finely divided magnesium per weight of feedstock,
   (b) heating said magnesium-feedstock mixture in a hydrogen atmosphere to a temperature in the range 600–850° F. under a pressure of 100–2000 p.s.i.g. with a hydrogen flow rate of 0.5 to 1.5 moles of hydrogen per mole of feedstock per hour to produce magnesium sulfide, and
   (c) separating the treated feedstock from the magnesium sulfide.

6. A process as set forth in claim 5 in which the magnesium has a particle size in the range from about 25 to about 170 microns.

7. A process as set forth in claim 5 in which the magnesium has a particle size in the range from about 44 to about 149 microns.

References Cited
UNITED STATES PATENTS

| 1,859,028 | 5/1932 | Cross | 208—294 |
| 2,772,211 | 11/1956 | Hawkes et al. | 208—208 M |

DELBERT E. GANTZ, Primary Examiner

G. J. CRASANAKIS, Assistant Examiner